(12) United States Patent
Massoptier-David

(10) Patent No.: US 10,913,228 B2
(45) Date of Patent: Feb. 9, 2021

(54) CURING PRESS FOR A TIRE BLANK

(71) Applicant: COMPAGNIE GENERALE DES ETABLISSEMENTS MICHELIN, Clermont-Ferrand (FR)

(72) Inventor: Michael Massoptier-David, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/647,986

(22) PCT Filed: Sep. 14, 2018

(86) PCT No.: PCT/FR2018/052255
§ 371 (c)(1),
(2) Date: Mar. 17, 2020

(87) PCT Pub. No.: WO2019/053383
PCT Pub. Date: Mar. 21, 2019

(65) Prior Publication Data
US 2020/0254705 A1    Aug. 13, 2020

(30) Foreign Application Priority Data
Sep. 18, 2017 (FR) .................................. 17 58614

(51) Int. Cl.
*B29D 30/06* (2006.01)
*B29C 33/26* (2006.01)
(Continued)

(52) U.S. Cl.
CPC .......... *B29D 30/0629* (2013.01); *B29C 33/20* (2013.01); *B29C 33/44* (2013.01);
(Continued)

(58) Field of Classification Search
CPC .......... B29D 30/0629; B29D 2030/063; B29C 33/26; B29C 33/44
See application file for complete search history.

(56) References Cited

U.S. PATENT DOCUMENTS 3,704,082 A    11/1972  Hottle
3,989,791 A    11/1976  Tippin
(Continued)

FOREIGN PATENT DOCUMENTS

EP    1 935 624 A1    6/2008
FR    2 236 647 A1    2/1975
(Continued)

OTHER PUBLICATIONS

International Search Report dated Dec. 3, 2018, in corresponding PCT/FR2018/052255 (6 pages).

*Primary Examiner* — James P Mackey
(74) *Attorney, Agent, or Firm* — Venable LLP

(57) ABSTRACT

The press (1) for curing a green tyre has: a frame (2), at least one plate (4) that is mounted in a sliding manner with respect to the frame and comprises a plurality of pegs (22), a plurality of sectors (8) that are distributed circumferentially around the plate and are able to form all or part of the width of a tread of the tire, and, for each sector, at least one rocker (15) having at least one ramp (19) over which one of the respective pegs is able to pass.

14 Claims, 7 Drawing Sheets

(51) Int. Cl.
*B29C 33/20* (2006.01)
*B29C 33/44* (2006.01)
*B30B 7/00* (2006.01)
(52) U.S. Cl.
CPC .............. *B30B 7/00* (2013.01); *B29C 33/26* (2013.01); *B29D 2030/063* (2013.01); *B29D 2030/0631* (2013.01)

(56) References Cited

U.S. PATENT DOCUMENTS

| | | | | |
|---|---|---|---|---|
| 4,035,119 A * | 7/1977 | Beres | ................ | B29D 30/0606 425/46 |
| 4,289,463 A * | 9/1981 | Le Moullac | ....... | B29D 30/0629 425/47 |
| 5,190,767 A * | 3/1993 | Beres | ................ | B29D 30/0629 425/28.1 |
| 5,667,812 A * | 9/1997 | Shimizu | ............. | B29D 30/0629 425/35 |
| 6,066,283 A * | 5/2000 | Nara | .................. | B29D 30/0629 264/326 |
| 8,454,336 B2 * | 6/2013 | Aperce | .............. | B29D 30/0629 425/46 |
| 10,603,856 B2 * | 3/2020 | Massoptier-David | ....................... | B29D 30/0605 |
| 2008/0152742 A1 | 6/2008 | Bachochin et al. | | |

FOREIGN PATENT DOCUMENTS

| | | |
|---|---|---|
| FR | 2 306 069 A1 | 10/1976 |
| FR | 2 998 830 A1 | 6/2014 |
| JP | 2006-312251 A | 11/2006 |
| SU | 872286 | 10/1981 |
| WO | 2011/001095 A1 | 1/2011 |
| WO | 2017/098158 A1 | 6/2017 |
| WO | 2017/098159 A1 | 6/2017 |

* cited by examiner

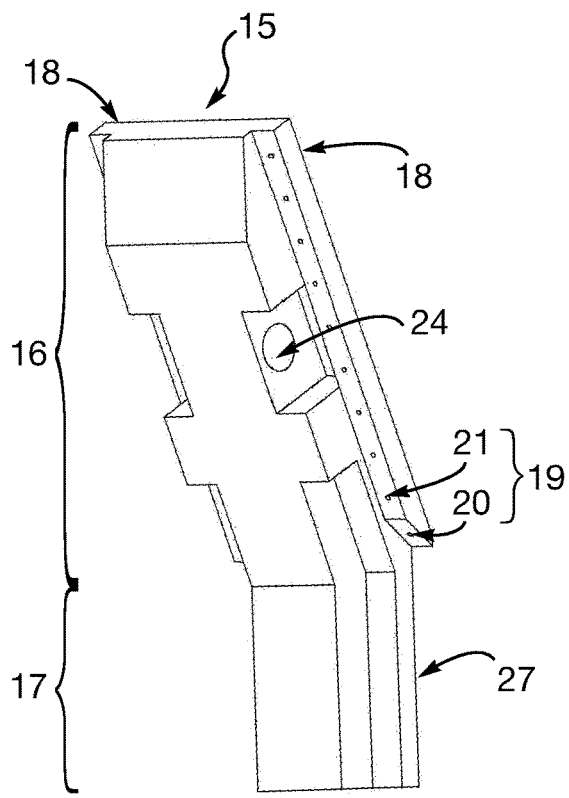
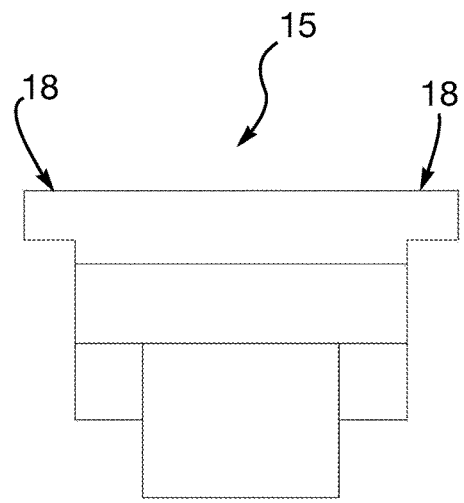
Fig. 4B
Fig. 4A
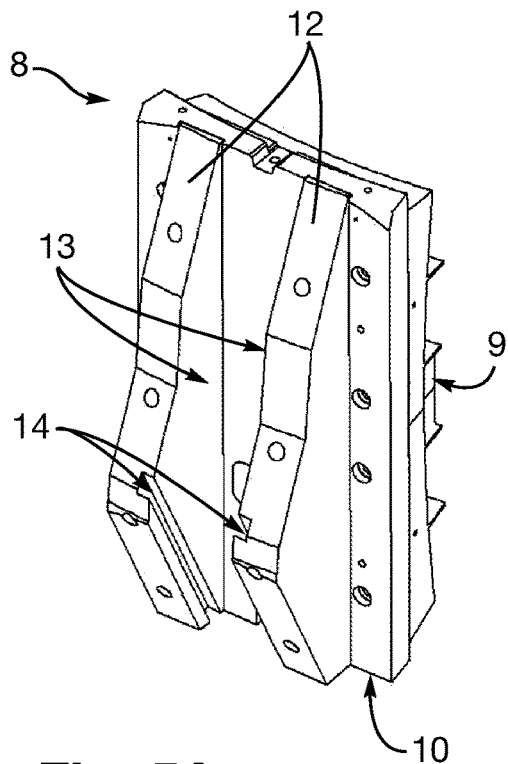
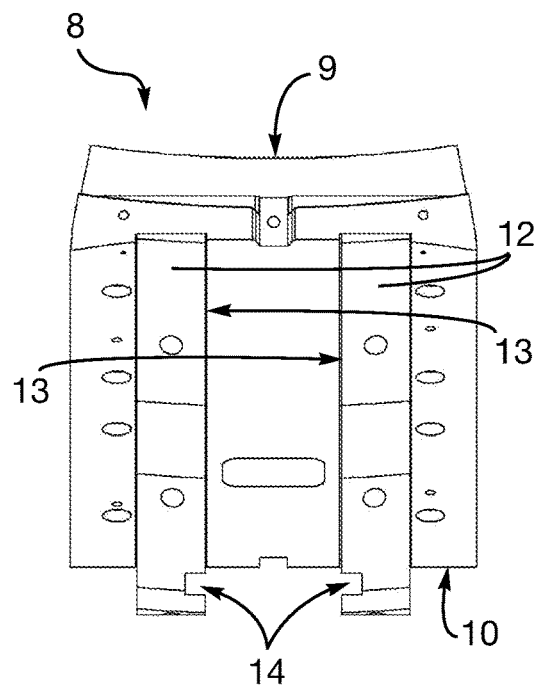
Fig. 5A
Fig. 5B

CURING PRESS FOR A TIRE BLANK

BACKGROUND

The invention relates to the manufacture of tyres and in particular to the moulds for curing a green tyre. It relates in particular to tyres for civil engineering vehicles such as those used in mines.

The document WO 2011/001095, in the name of the applicant, discloses a press for curing a green tyre, comprising upper and lower plates that are able to be slid towards one another and comprising upper and lower shells for moulding the sidewalls of the green tyre, and also lateral sectors that are movable in a radial direction with respect to the axis of the mould and serve to mould the tread. During the opening of the mould, the upward sliding of the lower plate causes the sectors to slide radially with respect to the plate in order to release the green tyre. To this end, each sector is joined to a lever that is connected in an articulated manner to the sector, is linked to the frame of the mould and bears on a ramp of the plate forming a face oriented towards the axis. The radial sliding movement of the sectors makes it easier to demould the tread patterns of the tread.

The manufacture of tyres for civil engineering vehicles raises particular problems. Specifically, these tyres have very large dimensions. Moreover, recent models comprise, on their tread, a large number of relatively fine and deep grooves that may have a complex shape (for example wavy, in the form of a hook, etc.), making demoulding more tricky. Therefore, it is necessary to have a mechanism that makes it possible to retract the sectors over a travel greater than the travel of a sliding movement or of a movement similar to a sliding movement.

The documents WO 2017/098158 and WO 2017/098159, in the name of the applicants, disclose curing presses of which the sectors exhibit greater retraction. Nevertheless, new devices are always useful for making it possible to choose the one that is most suitable for the curing of a particular green tyre. Moreover, the prior art devices have the drawback of being bulky. However, it is particularly advantageous, in particular for logistical reasons, for a green tyre to be able to be accommodated by the smallest possible curing mould. Generally, it is particularly useful for one and the same press to be able to cure tyres having different dimensions.

Therefore, it is an aim of the invention to make it easier to mould and demould tyres intended for civil engineering vehicles.

Another aim of the invention consists in providing a press that can be used to cure a tyre with particularly large dimensions compared with those of the press.

SUMMARY

To this end, the invention provides a press for curing a green tyre, having:
- a frame,
- at least one plate that is mounted in a sliding manner with respect to the frame and comprises a plurality of pegs,
- a plurality of sectors that are distributed circumferentially around the plate and are able to form all or part of the width of a tread of the tyre, and,
- for each sector, at least one rocker having at least one ramp over which one of the respective pegs is able to pass.

The passing of the peg over the ramp of the rocker causes the rocker to rock, which then itself causes the sector to which it is joined to rock. This rocking makes it possible to more easily release the tyre at the end of curing, more particularly when the tyre has large dimensions compared with the mould. The peg preferably has small dimensions so as to bring about a minimum space requirement and thus to be usable in moulds with small dimensions. As many rockers as sectors can be provided. It is also possible for each sector to be joined to a plurality of rockers, for example to two rockers. As many pegs as ramps can be provided, each peg being able to pass over one of the respective ramps.

The rocker can have any shape that is compatible with its function, which consists in rocking the sector to which it is joined when a peg carried by the plate passes over its ramp. Provision can be made, for example, for it to have an elongate overall shape and to have at least one rectilinear portion, for example two rectilinear portions that are inclined with respect to one another.

The plate may be an upper plate or a lower plate as seen with respect to a median plane passing through the centre of the mould formed by the sectors.

Advantageously, the press is designed so as to cause at least one of the sectors to slide with respect to the frame under the effect of sliding of the plate.

The sectors slide in a radial direction with respect to an axis of the press. This sliding may be in a direction away from an axis of the press, this being referred to as sector retraction, or towards the axis. Provision can be made for upward sliding of the plate to make it possible to retract at least one of the sectors. This radial retraction makes it possible to withdraw the sectors without damaging the tread patterns of the tread when they are particularly deep. It is thus particularly useful to obtain sliding along the longest possible travel in order to reduce the risk of damaging the tread patterns. Provision can also be made for downward sliding of the plate to make it possible to slide at least one of the sectors toward the axis of the press.

Advantageously, the or each peg and the or each ramp are designed to rock the or each sector after the sectors have slid.

Specifically, this rocking makes it easier to remove the tyre that has just been vulcanized in the mould. This rocking takes place once each sector has been entirely freed of the tread patterns of the tread. Moreover, in a conventional press, it is possible, at the start of the moving apart of the sectors, for the latter to be retained elastically by the rubber of the tyre. To remedy this, this rocking movement makes it possible to properly separate the sectors from the tread.

Advantageously, an edge of the plate is able to bear against the rocker and to cause the latter to rock.

In this way, the edge of the plate makes it possible in particular to accompany and ensure the passage of the sector from a rocked position to a moulding position. Without this accompaniment, the rocking for returning to the moulding position is not ensured and is due only to gravity.

Provision can be made for the press to be designed such that the edge of the plate causes the rocker to rock while the plate slides. Provision can be made, for example, for a circumferential edge of the plate to be able to bear against a face of the rocker and to cause the latter to rock, this rocking being preferably forward rocking, that is to say rocking towards the axis of the press. The sliding of the plate may be upward or downward, preferably downward. Thus, this rocking takes place after the casing of the tyre to be vulcanized has been loaded into the mould and while the mould is in a moulding position.

Preferably, the ramp or each ramp of the rocker comprises two rectilinear portions, each portion having a different inclination from the other.

Such portions can have different functions. Provision can be made, for example, for a first portion, when it is passed over by one of the pegs, to cause the rocker to rock and thus cause the sector joined to this rocker to rock, and for a second portion, when it is passed over by the same peg, to stabilize the rocker, and thus the sector, in the rocked position. The risk of the sector rocking accidentally and damaging for example the tyre present in the mould is thus reduced.

Advantageously, the pegs being rocking pegs, at least one of the rockers is mounted so as to be rotatable about a rotation peg that is fixed with respect to the frame, preferably all of the rockers being mounted so as to be rotatable about respective rotation pegs that are fixed with respect to the frame.

The presence of the rotation peg stabilizes the rotation of the rocker and thus that of the sectors. In this way, the rocker is fixed in terms of sliding with respect to the frame and rotatable with respect to the latter, this further stabilizing the movement in rotation of the rocker and thus of the sectors. The rotation peg may be fixed directly to the frame or to another element of the press, which is itself fixed with respect to the frame.

Preferably, the press also comprises a hooping ring, the or at least one of the rotation pegs being carried by the hooping ring, preferably all of the rotation pegs being carried by the hooping ring.

For example, the hooping ring may extend circumferentially around the plate and the sectors and be fixed with respect to the frame.

Preferably, at least one of the sectors is designed to bear on the rocker and/or the hooping ring so as to slide with respect to the frame.

These respective bearing states make it possible to stably guide the sliding movement of the sectors, and to retract the sectors over a large amplitude in order to suitably demould the tread patterns of the tyres. Stable retraction of the sectors avoids damage to the tread patterns of the tyre by the sectors during this retraction. Moreover, the stabler the sliding movement, the more it is possible to provide for this sliding to occur with a large amplitude.

Provision can be made for it to be the combination of the driving brought about by the sliding the plate and the bearing of the sectors both on the rocker and on the hooping ring that makes it possible for the sectors to slide, and in particular to be retracted radially. The interaction with these three elements of the press makes it possible to stabilize the sliding movement of the sectors even further. Provision can be made for at least one of the sectors to bear on the frame instead of the hooping ring, or even for this to be the case for all the sectors.

Advantageously, the ramp of the rocker being a rocking ramp, at least one of the rockers also comprises at least one sliding ramp on which the sector is able to bear and to slide.

This ramp makes it possible to guide the sliding of the sector. Specifically, while the sector slides, in particular during radial retraction, the sector bears on the sliding ramp and slides along the latter following the direction of this ramp. For example, if the sector passes towards the top of an upwardly inclined sliding ramp when it is passed over in the direction away from the axis of the press, this passage causes sliding in a radial direction away from the axis and thus allows radial retraction of the sector. If the sector passes towards the bottom of this same ramp, this passage causes sliding in the direction of the axis of the press.

Preferably, the or each sliding ramp is rectilinear and inclined upwardly when it is passed over in the direction away from a main axis of the plate.

A rectilinear ramp makes it possible to confer the largest possible amplitude on the sliding, in particular the greatest possible retraction. As indicated above, such an orientation allows the sector, when it passes upwardly over the sliding ramp, to have a radial retraction movement. Of course, provision can be made for the ramp to have some other shape, for example a curved shape.

Preferably, at least one of the sectors comprises at least one rectilinear groove having a face that is able to cooperate with the sliding ramp of the rocker, preferably at least one of the rockers comprises at least two sliding ramps, the sector comprising at least two rectilinear grooves that each comprise a face that is able to cooperate with one of the respective sliding ramps of the rocker.

Provision can be made, for example, for the groove to comprise one, two or three faces, at least one of the faces being able to cooperate with the sliding ramp. This groove stabilizes and guides the sliding movement of the sector with respect to the rocker.

The presence of two grooves and of two sliding ramps makes it possible to stabilize the sliding movement even further. Provision can be made, for example, for each rocker to comprise more than two sliding ramps, for example three, four, five or six sliding ramps. Provision can likewise be made for each sector to comprise at least as many rectilinear grooves as the rocker to which it is joined comprises sliding ramps, each groove having a face that is able to cooperate with one of the respective sliding ramps.

Preferably, the rocker comprising two sliding ramps, the two ramps are parallel and each protrude from respective lateral edges of the rocker.

Advantageously, the press also comprises:
- a second plate, the first plate forming a lower plate and the second plate forming an upper plate, the upper plate being mounted in a sliding manner with respect to the frame and comprising a plurality of rocking pegs,
- a plurality of sectors that are distributed circumferentially around the upper plate and are able to form, with the sectors distributed circumferentially around the lower plate, the tread of the tyre, and,
- for each sector, at least one rocker having at least one ramp over which a respective one of the rocking pegs of the upper plate is able to pass.

In this way, the mould is divided into two parts, an upper part and a lower part, that may be mutually symmetric. In such a configuration, provision can be made for each sector to have a height approximately equal to half of the height it would have in a conventional mould. Thus, a sector present on the lower part of the mould is in contact with a counterpart sector present on the upper part of the mould when the mould is closed, so as to reproduce a conventional sector height. Since the sectors have a smaller height, each sector needs to rock to a lesser extent compared with a conventional mould in order to obtain the same opening. Furthermore, in operation, the upper part of a mould needs to be movable in order for it to be possible to introduce the green tyre into the mould and to remove it therefrom after it has been vulcanized. A press is generally not robust enough to carry an entire mould and the upper part thus generally comprises only the upper plate. However, the press is robust enough to carry a mould half as presented above.

The invention also relates to a method for manufacturing a tyre, in which the tyre is cured in a press as described above.

BRIEF DESCRIPTION OF THE FIGURES

Two embodiments of the invention that are given by way of non-limiting example will now be described with reference to the appended drawings, in which:

FIGS. 4A and 4B are a perspective view and an end-on view, respectively, of the rocker shown in FIGS. 1A to 3D;

FIGS. 5A and 5B are perspective views of a sector of the mould shown in FIGS. 1A to 4B.

DETAILED DESCRIPTION

Figure 1A:
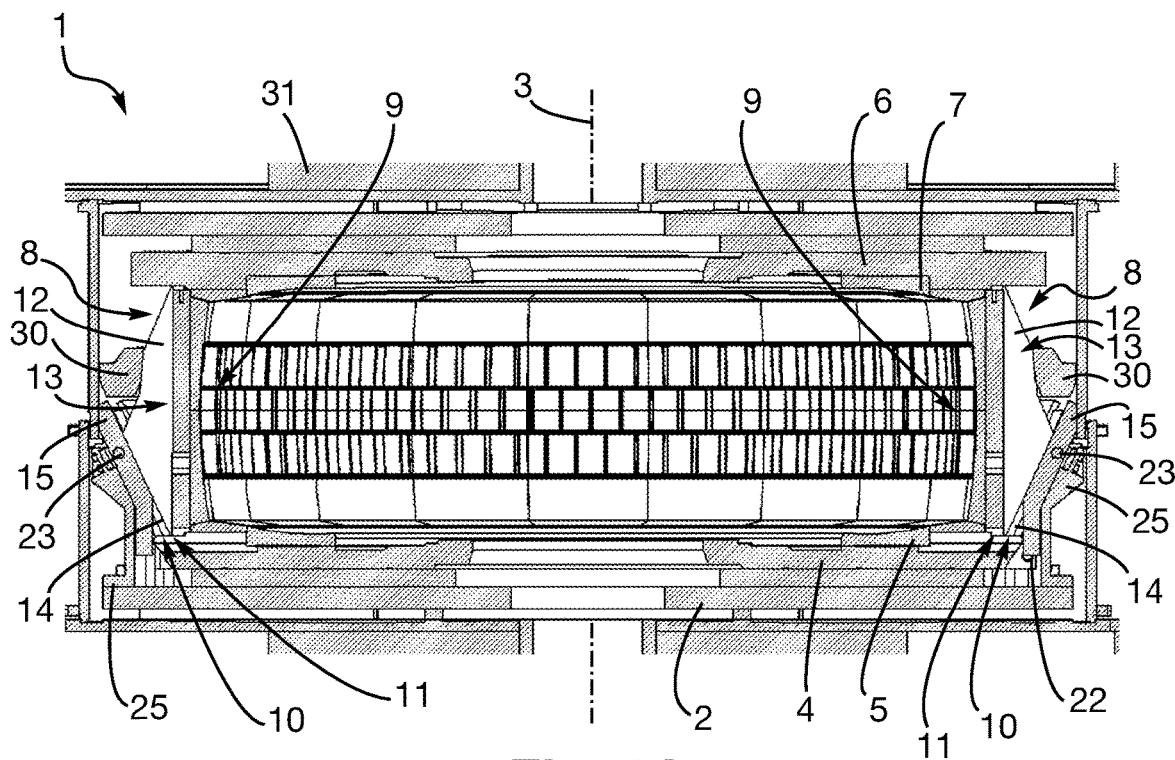
FIGS. 1A to 1D are views in vertical axial section of a press according to a first embodiment of the invention during successive steps in the opening of the curing mould.

A press according to two embodiments of the invention will be described with reference to the figures. This press serves to cure and shape green tyres for wheels. This may be a wheel of a vehicle such as a utility vehicle, a passenger vehicle or a vehicle of the heavy-duty type. In the present case, it is a press for green tyres for civil engineering vehicles such as those used in mines.

First Embodiment (FIGS. 1A to 5B)

The press 1 comprises a frame 2 forming a base of the mould, which, in the following, is assumed to be stationary and fixed to the ground. Said press 1 has an overall shape exhibiting symmetry of revolution about a vertical axis 3.

The press 1 comprises a lower plate 4 carrying a shell 5 that is rigidly fixed to the plate 4, on top of the latter. The plate 4 is mounted so as to be vertically slidable along the axis 3 with respect to the frame 2. For this purpose, the press comprises guiding and drive means that are conventional and not described in detail here.

Similarly, the press comprises an upper plate 6, to which an upper shell 7 is rigidly fixed, under the plate, the plate being mounted so as to be vertically slidable along the axis 3 with respect to the frame 2, in this case again by way of guiding and drive means that are conventional and not described in detail. In order to make it possible to open the mould, the upper plate 6 slides independently of the lower plate 4.

The press 1 also comprises lateral sectors 8, which extend at the periphery of the press. A press generally comprises between ten and thirty sectors 8. Nine sectors are shown in FIGS. 1A to 1D. Of course, there are sectors that are not shown and the press 1 comprises a larger number thereof in total. Only one of the sectors 8 is shown in FIGS. 3A to 3D. In the present case, each sector 8 comprises an internal front face having a moulding part 9 that extends in the vertical direction and is oriented towards the axis 3.

The press furthermore comprises a clamping ring 30, which keeps the sectors 8 in position while the press is being pressurized.

Each sector 8 also has a flat lower face 10 that is able to rest on an upper face 11 of the lower plate 4. In its rear part, on the opposite side from the axis 6, the sector comprises two vertical platens 12 that are fixed to the moulding part by their edge that is directed towards the axis, are parallel to one another and are spaced apart from one another, the platens being mutually symmetric with respect to a plane radial to the axis 3 (see FIGS. 5A and 5B). Each platen 12 has an internal lateral face 13 facing the internal lateral face 13 of the other platen 12. Each internal lateral face 13 of a platen 12 comprises a rectilinear groove 14 having three faces, namely an upper flank, a lower flank and an end wall. The grooves 14 are inclined upwards when they are passed along in a direction away from the axis 3 of the press 1.

The shells 5, 7 and the sectors 8 together form a curing mould for the tyre. The shells 5, 7 serve mainly to form the respective lateral sidewalls of the tyre, while the sectors 8 form the tread thereof, comprising in particular tread patterns including grooves that are fine, deep and/or of complex shape. During moulding and curing, the shells 5, 7 and the sectors 8 form a closed enclosure that can be pressurized and heated to effect the vulcanization of the rubber of the green tyre in order to produce the tyre. The heating and pressurizing means are conventional and will not be described here.

The lower plate 5 comprises rocking pegs 22 that are distributed equidistantly around the entire perimeter of the lower plate 4. In the present case, the lower plate comprises as many rocking pegs 22 as rockers 15. The rocking pegs 22 have an elongate and circular cylindrical overall shape. A main longitudinal axis of each peg is horizontal and tangent to the circumferential direction with respect to the axis 3 of the press.

The rockers 15 each comprise an upper part 16 and a lower part 17 that are inclined with respect to one another (see FIGS. 4A and 4B). Each rocker 15 comprises two sliding ramps 18 and two rocking ramps 19.

The sliding ramps 18 protrude all along the lateral edges of the upper part 16.

Each rocking ramp 19 comprises a lower portion 20 and an upper portion 21, the lower portion 20 being able to rock the rocker 15 when the latter is passed over by a rocking peg 22, and the upper portion 21 being able to keep the rocker 15 in the rocked position when the rocking peg 22 is bearing thereon. The lower portion 20 and upper portion 21 of the rocking ramp 19 are each rectilinear and inclined with respect to one another. Each rocker 15 also comprises, in a median portion that is situated in the upper part 16 in the present case, a through-orifice 24 that is able to receive a rotation peg 23.

In the present case, the press comprises a hooping ring 25 that is able to extend circumferentially around the plate 4 and the sectors 8. The hooping ring 25 is fixed with respect to the frame 2 and has an internal face 26, on which the platens 12 of the sectors 8 are able to bear. In the embodiment presented, each rotation peg 23 is carried directly by the hooping ring 25.

Each sector 8 is mounted so as to be slidable with respect to a rocker 15. Each rocker 15 is mounted in a rotatable manner with respect to the hooping ring 25.

When the mould is in the closed position (see FIG. 1A), each sector 8 rests with a lower face 10 on an upper edge 11 of the plate 4. A main longitudinal axis of the lower part 17 of the rocker 15 is parallel to the axis of the press 3. A main longitudinal axis of the upper part 16 of the rocker 15 is inclined with respect to the axis 3 and is oriented upwardly when it is passed over in the direction away from the press 1. In the embodiment presented, the protrusions formed by the sliding ramps 18 are housed inside the grooves 14 that are present on the internal lateral faces 13 of the platens 12, such that the upper flank of the groove 14 bears against the sliding ramp 18. The rocking peg 22 is at a distance from and opposite the rocking ramp 19.

Figure 1B:
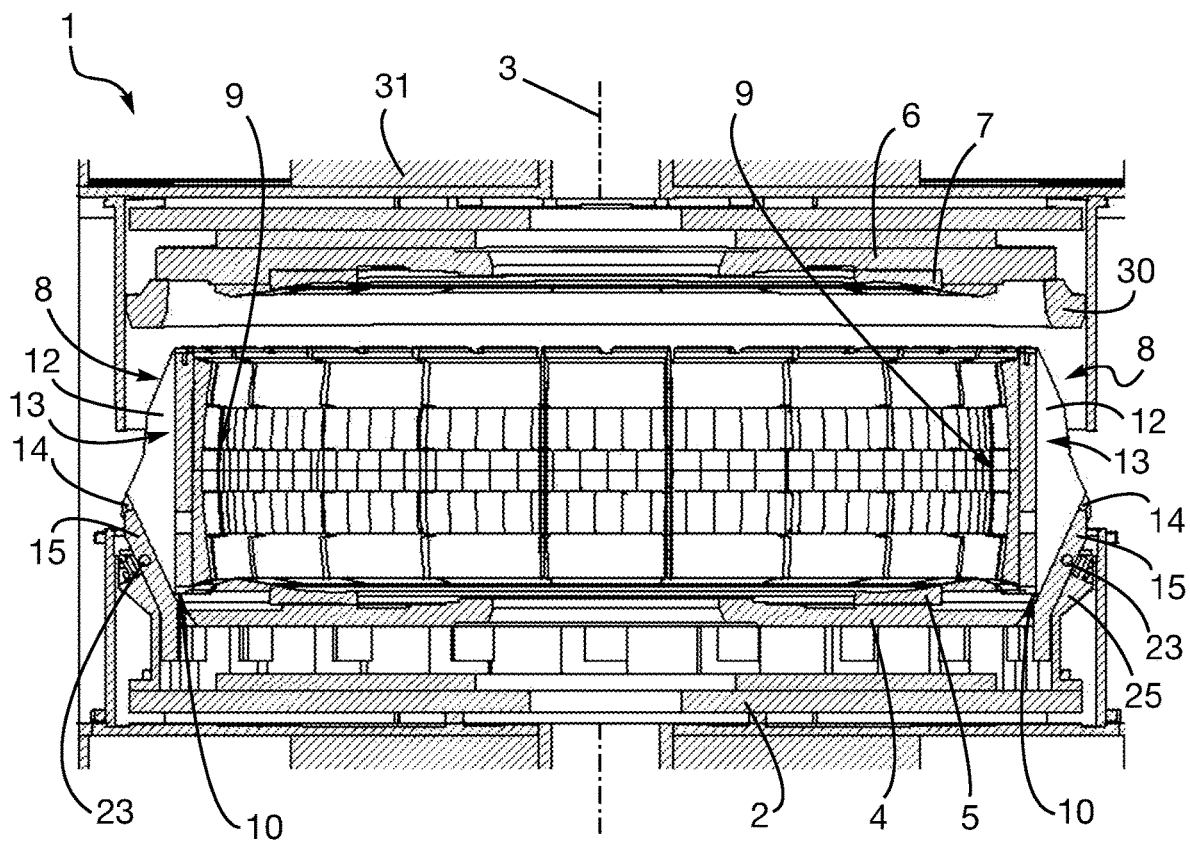
Figure 1C:
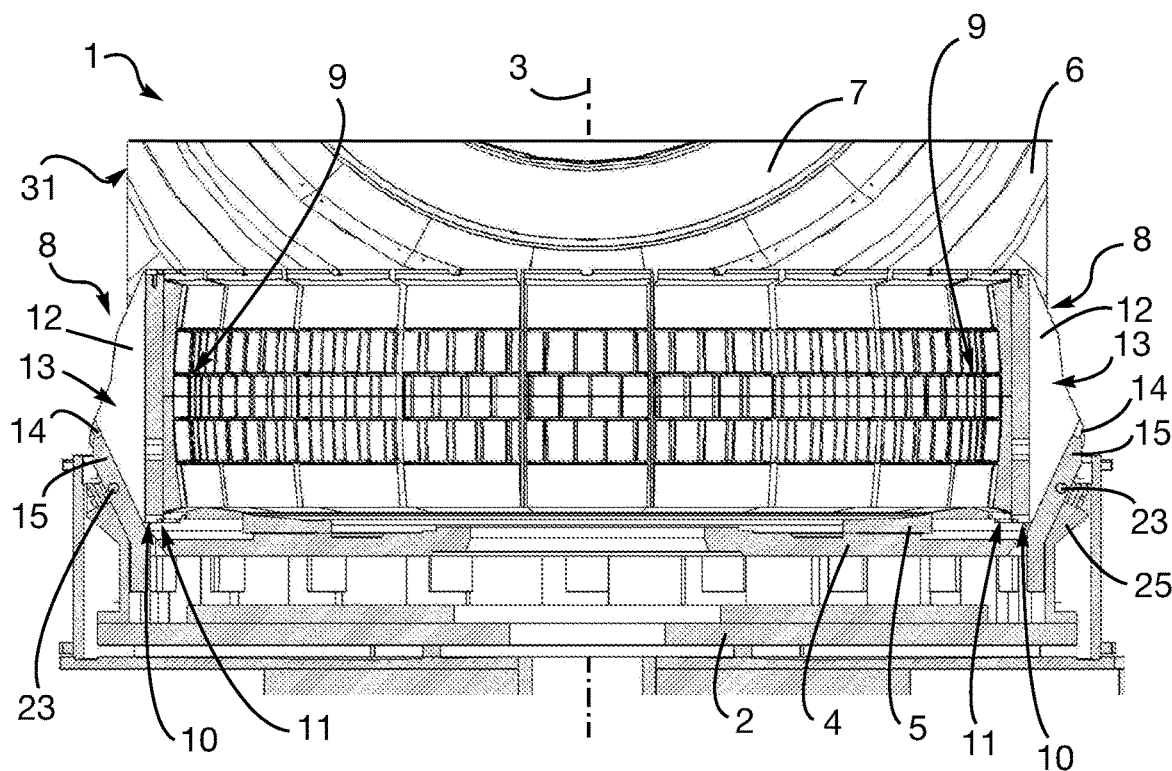
Figure 1D:
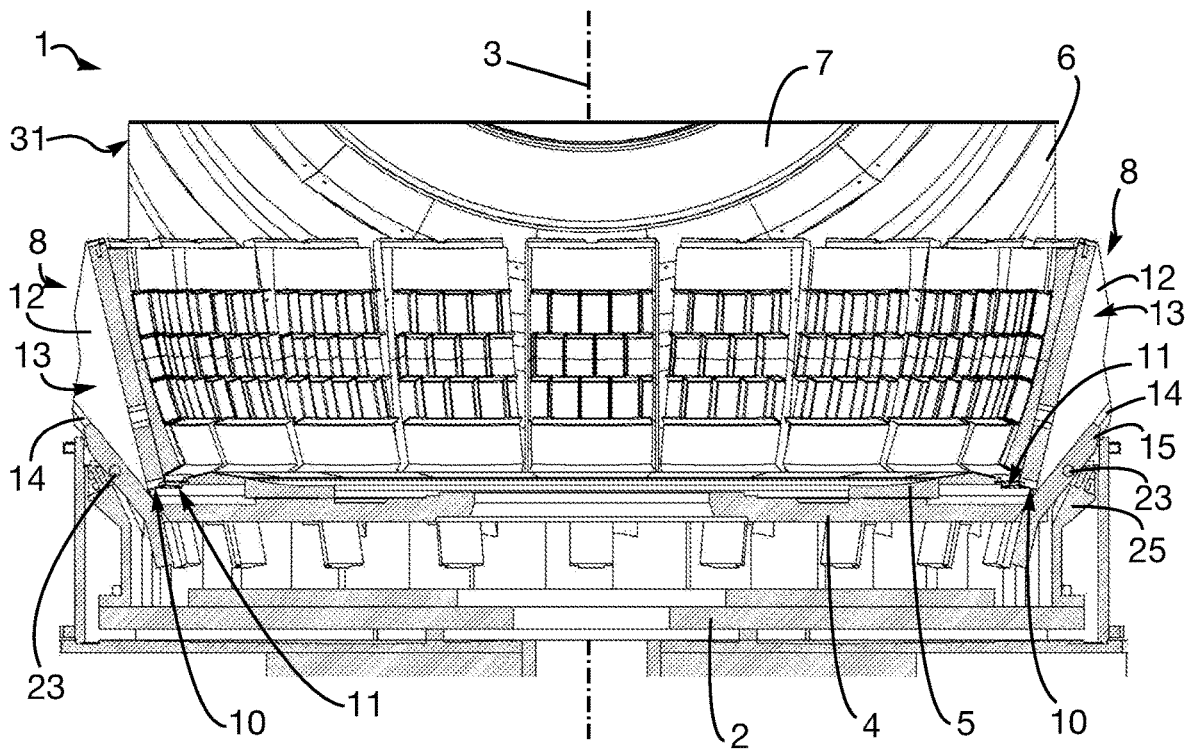

During demoulding, first of all, the upper plate 6 and lower plate 4 slide vertically upwards (see FIG. 1B) with respect to the frame 2. The sliding of the upper plate is such that it moves away from the sectors, as can be seen in FIG. 1B. Beforehand, the clamping ring 30 was also moved by being slid upwards away from the sectors 8.

Since the sectors 8 bear against the lower plate 4, they are driven upwards. Each sector 8 is also connected to one of the rockers 15 by being mounted in a slidable manner. The combination of the upward vertical sliding of the plate and of this connection brings about the radial sliding of each sector with respect to the plate. During radial retraction, each sector 8 passes over a respective sliding ramp of one of the rockers 15. None of the rocking pegs 22 has yet come into contact with the rocking ramp 19 that it faces. However, each rocking peg 22 has moved towards the rocking ramp 19. Similarly, at this stage, the rockers remain stationary with respect to the frame.

Secondly (see FIGS. 10 and 2A), the lower plate 4 continues to slide upward and the upper plate 6 for its part rotates about a horizontal axis so as to open up an upper opening of the mould in order that the tyre (not shown) can be withdrawn therefrom. The rocking peg 22 is close to the rocking ramp 19 but has not yet passed over the latter.

Figure 2A:
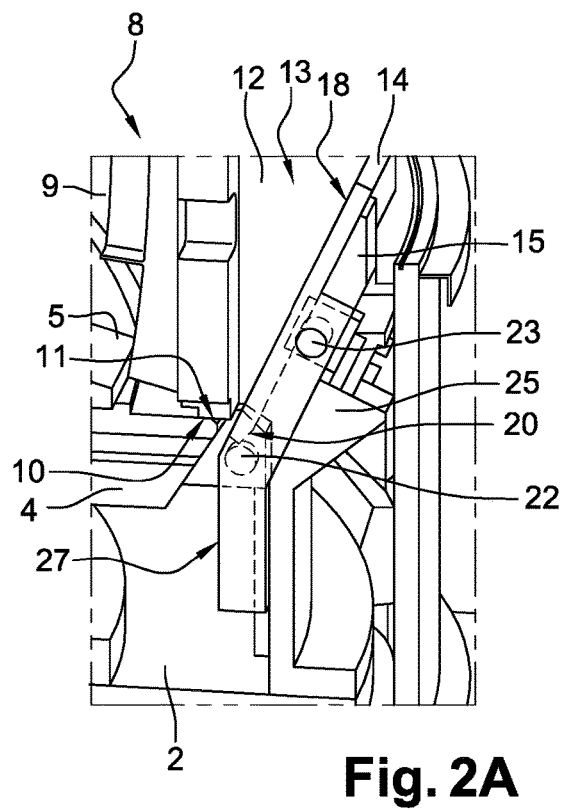
FIGS. 2A to 2D are views in vertical axial section of the press in FIGS. 1A to 1D during successive steps in the opening of the curing mould, showing more particularly the interactions between a rocking peg and rocking ramp.
Figure 2B:
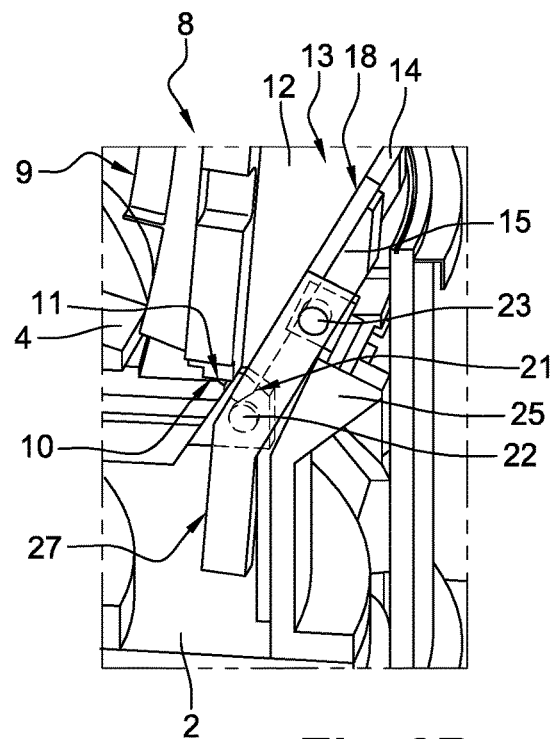
Figure 2C:
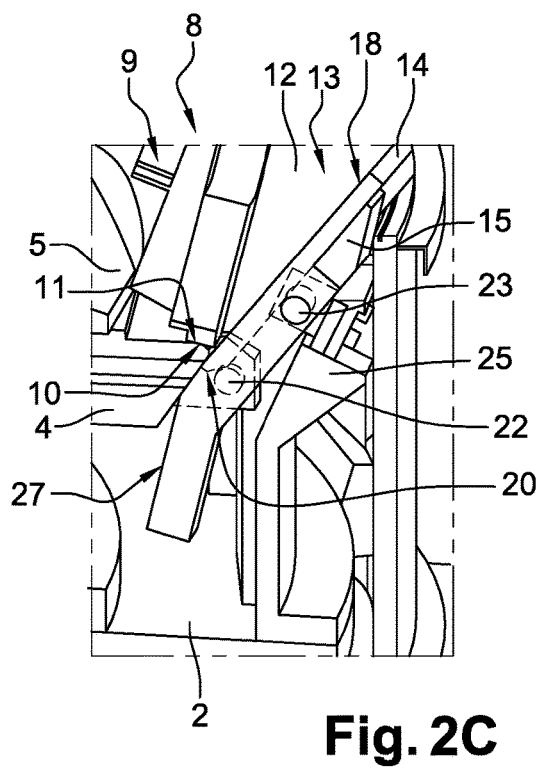
Figure 2D:
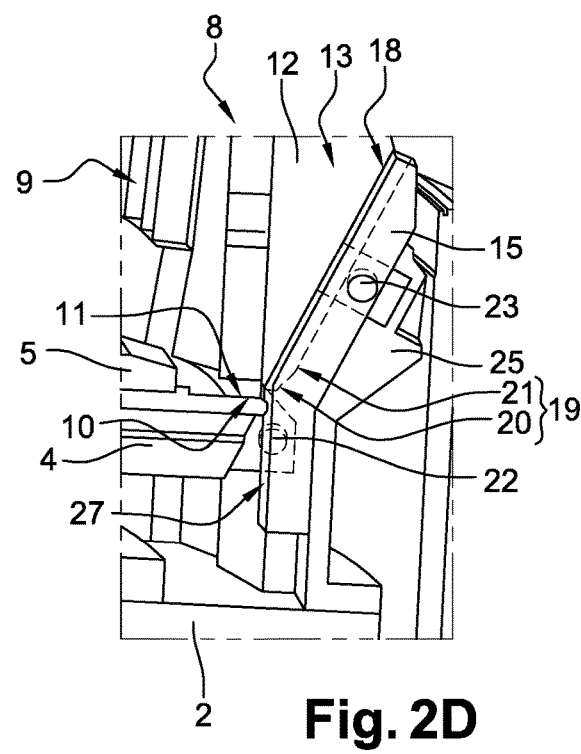
Figure 3A:
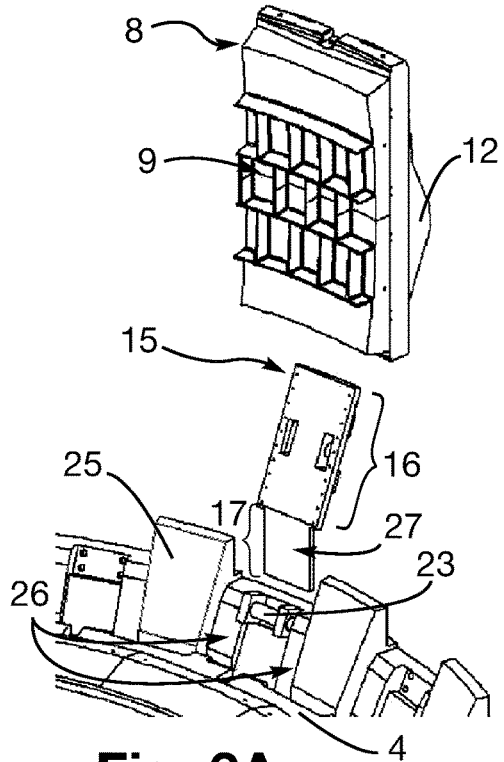
FIGS. 3A to 3C are perspective and exploded views of a lower part of the curing mould in FIGS. 1A to 2D, in which a single sector and a single rocker are shown.
Figure 3B:
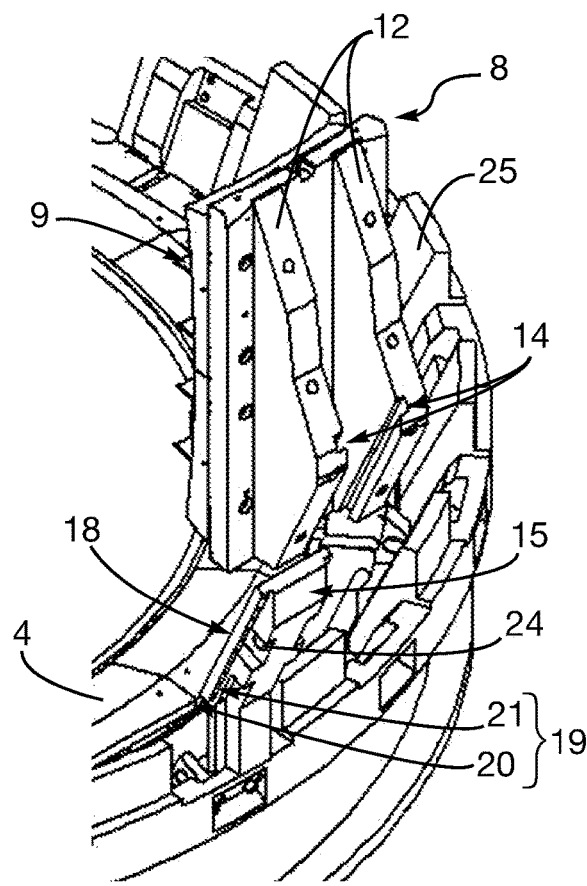
Figure 3C:
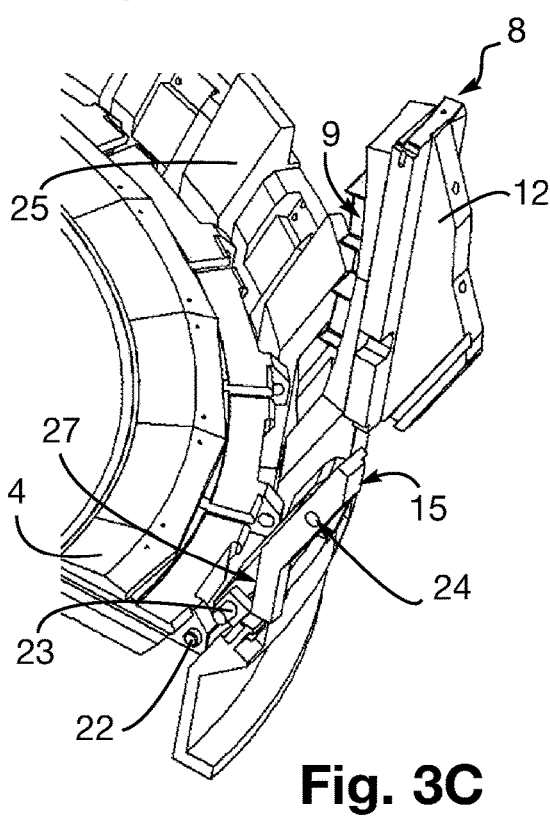
Figure 3D:
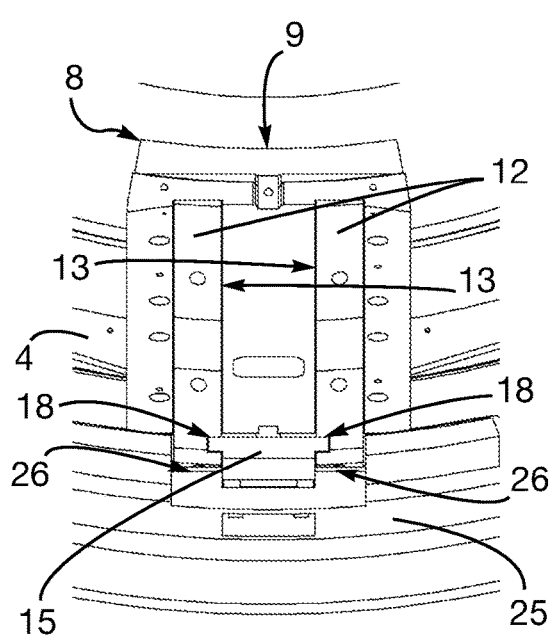
FIG. 3D is a perspective view of a detail of the lower part of the curing mould in FIGS. 3A to 3C.

The upward sliding movement of the plate 4 continues (see FIG. 2B). The rocking peg 22 then passes over the first portion 20 of the rocking ramp 19 and thus causes the rocker 15 to rock about the rotation peg 23, in the process causing the sector 8 to rock away from the axis, that is to say towards the outside. A round opening is produced in the lower part of the mould. The sliding of the plate 4 continues until maximum rocking of the rocker 15 and thus of the sector 8 is obtained (see FIGS. 1D and 2C). In this configuration, the rocking peg bears on the second portion 21 of the rocking ramp 19 such as to keep the rocker 15, and thus the sector 8, in the rocked position. In this position, the retraction of the sectors is at a maximum and the rocking thereof makes it possible to easily remove the tyre from the mould without risking damaging it, and notably without risking damaging the tread patterns thereof.

Once the tyre has been withdrawn, a new green tyre intended to be vulcanized can be introduced into the mould. The lower plate 4 then slides vertically downwards in order to return to its initial position. During this sliding movement, a circumferential edge of the plate 4 bears against a face 27 of the lower part 17 of the rocker 15. This bearing causes the rocker 15, and thus the sector 8, to rock in the direction of the axis 3. As indicated above, without this bearing on the rocker 15, the latter would not necessarily rock in the direction of the axis 3, and this would make it impossible to suitably cure the green tyre newly introduced into the mould.

Figure 6A:
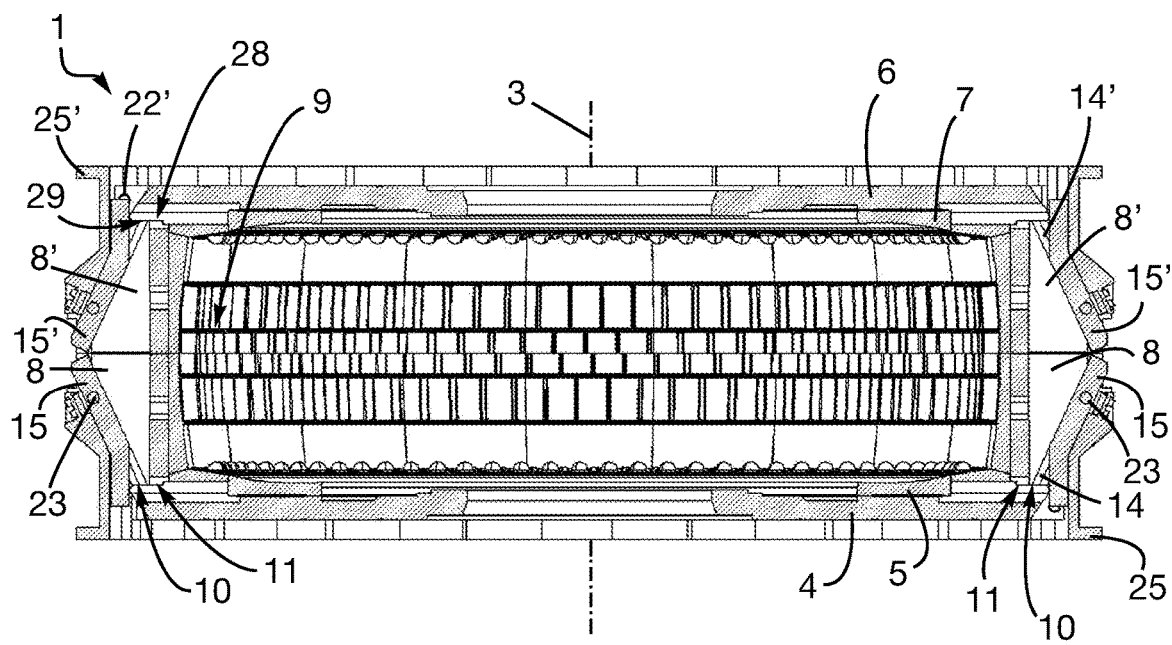
FIGS. 6A to 6C are views in vertical axial section of a press according to a second embodiment of the invention during successive steps in the opening of the curing mould.
Figure 6B:
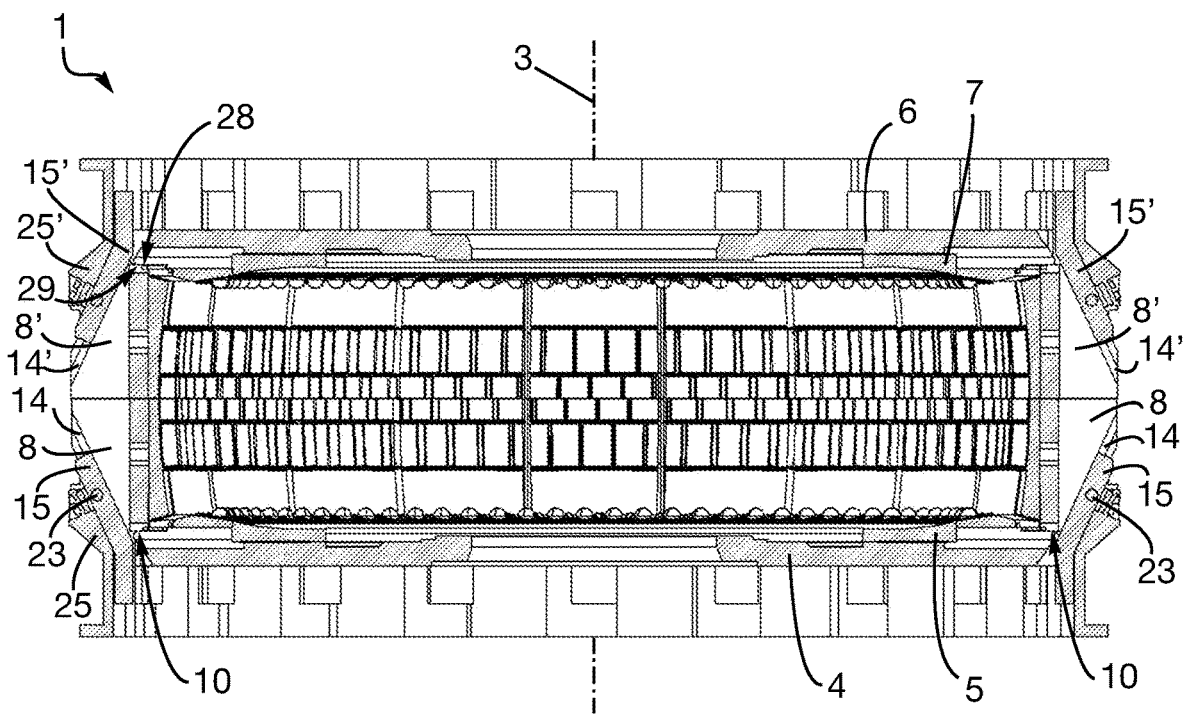
Figure 6C:
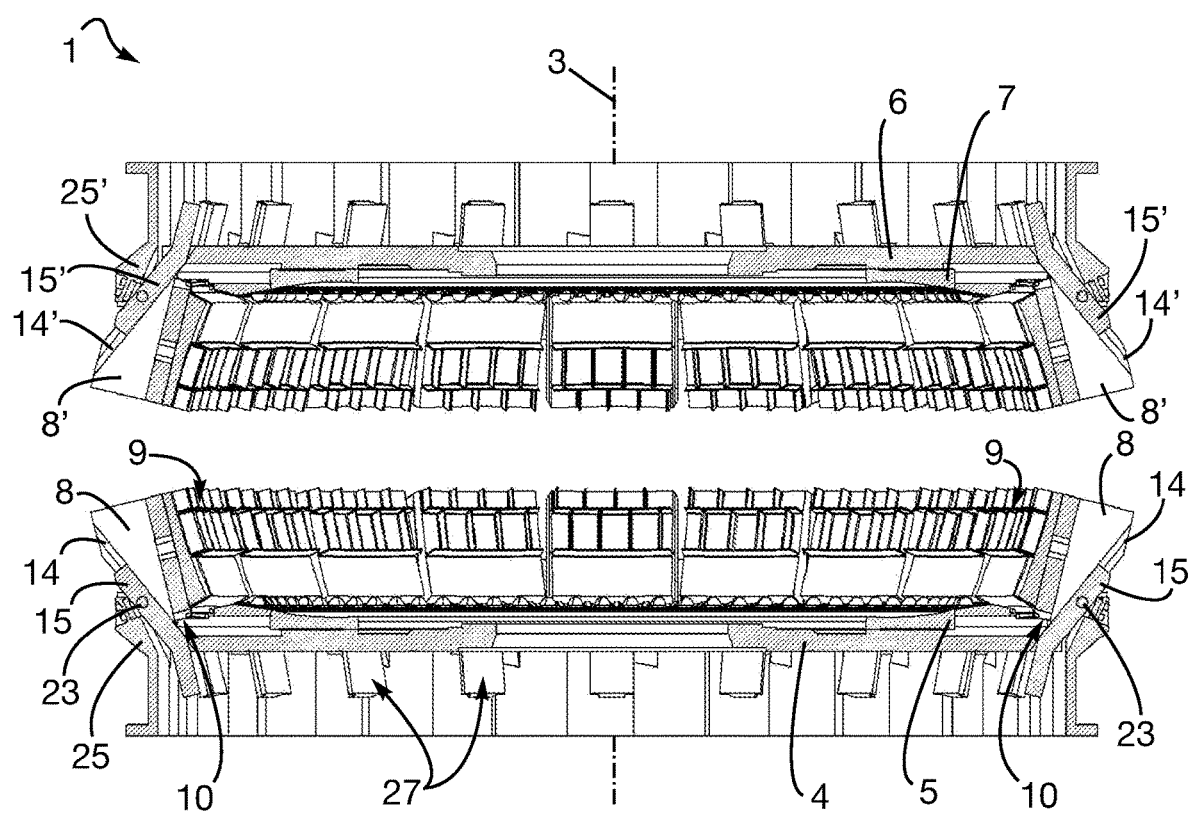

Second Embodiment (FIGS. 6A to 6C)

This embodiment differs from the previous embodiment in that the mould is in two parts that are substantially symmetric with respect to a plane perpendicular to the axis 3. Specifically, in this embodiment, the upper part of the mould, in addition to comprising the upper plate 6 and the upper shell 7, comprises a plurality of sectors 8' that are distributed circumferentially around the upper plate, a rocker 15' for each sector 8', and a hooping ring 25' extending circumferentially around the plate 6. The characteristics and the arrangements of these components are similar to those presented in the previous embodiment.

In this embodiment, each sector 8, 8' has a height around half that of the sectors 8 of the first embodiment. This difference is compensated by the fact that, for each sector 8 of the lower plate, there is a counterpart sector 8' around the upper plate, these two sectors being complementary and together forming a sector with dimensions similar to those of the sectors of the first embodiment (see FIG. 6A).

Another difference lies in the fact that the hooping ring 25' is vertically slidable along the axis 3 with respect to the frame. In addition, it is this sliding of the hooping ring 25', to which the rockers 15' are fixed, that allows the rocking of the sectors 8'.

In the closed position (see FIG. 6A), a lower face 10 of the sectors 8 of the lower plate 4 bears against an upper face 11 of the plate 4. Moreover, the platens 12 of each sector 8 bear against a rocker 15 and against the hooping ring 25. An upper edge of each sector 8 bears against a lower edge of a counterpart sector 8' present around the upper plate 6. An upper face 28 of the sectors 8' bears against a lower edge 29 of the upper plate 6. Moreover, the platens of each sector 8' bear respectively against one of the rockers 15' and against the hooping ring 25'.

In order to open the mould, first of all, the lower plate 4 slides vertically upward and the upper plate 6 likewise slides upward in a manner synchronized with the former such that the upper faces of the sectors 8 of the lower plate 4 remain in contact with the lower faces of the sectors 8' of the upper plate 6. The upper hooping ring 25' for its part also slides vertically upward in a relative movement with respect to the upper plate 6, such that the sectors 8' slide over the sliding ramps of the rockers 15'. The sectors 8, 8' thus slide in a synchronized manner away from the axis 3 with respect to their respective plates. None of the rocking pegs 22, 22' has yet passed over a rocking ramp of a rocker 15, 15', and so none of the sectors 8, 8' has yet rocked (see FIG. 6B).

The upper plate 6 and the hooping ring 25' then slide in a synchronized manner and in a relative movement with respect to one another such that the lower faces of the sectors 8' of the upper plate 6 are no longer in contact with the upper faces of the sectors 8 of the lower plate 4 (see FIG. 6C). The lower plate 4 slides with respect to the hooping ring 25 and in a synchronized manner with the upper part of the press where the hooping ring 25' slides vertically upward with respect to the upper plate 6, such that the rocking pegs 22, 22' each pass over a respective rocking ramp of a rocker 15, 15' so as to cause the sectors 8, 8' to rock (see FIG. 6C).

This time, a round opening is thus produced simultaneously in the lower part and the upper part of the mould.

The upper part of the mould then pivots with the cover 31 of the press along a horizontal axis, the tyre casing can then be withdrawn and a new green tyre can be introduced into the mould.

The invention is not limited to the embodiments presented and other embodiments will become clearly apparent to a person skilled in the art. Thus, for a press of smaller dimensions, the sectors are moved by the relative sliding of the upper plate with respect to the upper hoop.

The invention claimed is:
1. A press for curing a green tire, the press comprising:
    a frame;
    at least one plate that is mounted in a sliding manner with respect to the frame and that comprises a plurality of pegs;

a plurality of sectors that are distributed circumferentially around the at least one plate and are able to form all or part of a width of a tread of the tire; and for each sector, at least one rocker having at least one ramp over which one of the respective pegs is able to pass.

2. The press according to claim 1, wherein at least one of the sectors slides with respect to the frame under the effect of sliding of the at least one plate.

3. The press according to claim 1, wherein each peg and each ramp rock each sector after each sector has slid.

4. The press according to claim 1, wherein an edge of the plate is able to bear against the at least one rocker causing the at least one rocker to rock.

5. The press according to claim 1, wherein the at least one ramp of the at least one rocker comprises two rectilinear portions, each portion having a respectively different inclination.

6. The press according to claim 1, wherein, the pegs being rocking pegs, the at least one rocker is mounted so as to be rotatable about a rotation peg that is fixed with respect to the frame.

7. The press according to claim 6 further comprising:
a hooping ring, the rotation peg being carried by the hooping ring.

8. The press according to claim 7, wherein at least one of the sectors is designed to bear on the at least one rocker, on the hooping ring, or on both the at least one rocker and the hooping ring, so as to slide with respect to the frame.

9. The press according to claim 1, wherein, the at least one ramp of the at least one rocker being a rocking ramp, the at least one rocker further comprises at least one sliding ramp on which the respective sector is able to bear and to slide.

10. The press according to claim 9, wherein the at least one sliding ramp is rectilinear and inclined upwardly when it is passed over in a direction away from a main axis of the plate.

11. The press according to claim 9, wherein at least one of the sectors comprises at least one rectilinear groove having a face that is able to cooperate with the at least one sliding ramp of the at least one rocker.

12. The press according to claim 11, the at least one rocker comprising two sliding ramps, wherein the two sliding ramps are parallel and each protrude from respective lateral edges of the at least one rocker.

13. The press according to claim 1 further comprising:
a second plate, the first plate being a lower plate and the second plate being an upper plate, and the upper plate being mounted in a sliding manner with respect to the frame and comprising a plurality of rocking pegs;

a plurality of sectors that are distributed circumferentially around the second plate and are able to form, with the plurality of sectors distributed circumferentially around the first plate, the tread of the tire; and for each sector that is distributed circumferentially around the second plate, at least one rocker having at least one ramp over which one of the respective rocking pegs of the second plate is able to pass.

14. A method for manufacturing a tire comprising:
curing the tire in a press according to claim 1.

* * * * *